United States Patent [19]

Hehl

[11] Patent Number: 4,578,026

[45] Date of Patent: Mar. 25, 1986

[54] SAFETY COVER ARRANGEMENT FOR INJECTION MOLDING MACHINE WITH DIE EXCHANGE MECHANISM

[76] Inventor: Karl Hehl, Arthur-Hehl-Strasse 32, 7298 Lossburg 1, Fed. Rep. of Germany

[21] Appl. No.: 569,158

[22] Filed: Jan. 9, 1984

[51] Int. Cl.$^4$ .................. B29C 45/17; B29C 45/84
[52] U.S. Cl. .................. 425/151; 425/152; 425/575; 425/183
[58] Field of Search .......... 425/73, 151, 575, 411, 425/182, 183, 186, 190, 581, 152

[56] References Cited

U.S. PATENT DOCUMENTS

| 3,728,057 | 4/1973 | Grundman | 425/151 X |
| 3,877,858 | 4/1975 | Smith | 425/151 X |
| 3,973,888 | 8/1976 | Hehl | 425/125 |
| 3,982,869 | 9/1976 | Eggers | 425/575 |

OTHER PUBLICATIONS

Erhöhte Wirtshaftlichkeit mit Arburg-Schiebeisch.

Primary Examiner—Jay H. Woo
Assistant Examiner—Timothy W. Heitbrink
Attorney, Agent, or Firm—Joseph A. Geiger

[57] ABSTRACT

A safety cover arrangement for the die closing unit of an injection molding machine equipped with a program-controlled die exchange mechanism using a translation table with two die emplacements alternatingly moving into a central transfer position for the die assemblies, the cover assembly comprising a central stationary cover portion with a vertical panel portion and an adjoining horizontal panel portion, two rectangular access openings flanking the stationary cover portion on opposite sides, and two sliding covers with matching vertical and horizontal panels closing said openings, the covers being openable, one at a time, by moving behind and below the central stationary cover portion, following the release of a cover latching mechanism by a cam on the translation table. Each sliding cover carries a control rail for the actuation of a pair of limit switches shutting down the machine operation, when the cover is opened.

17 Claims, 11 Drawing Figures

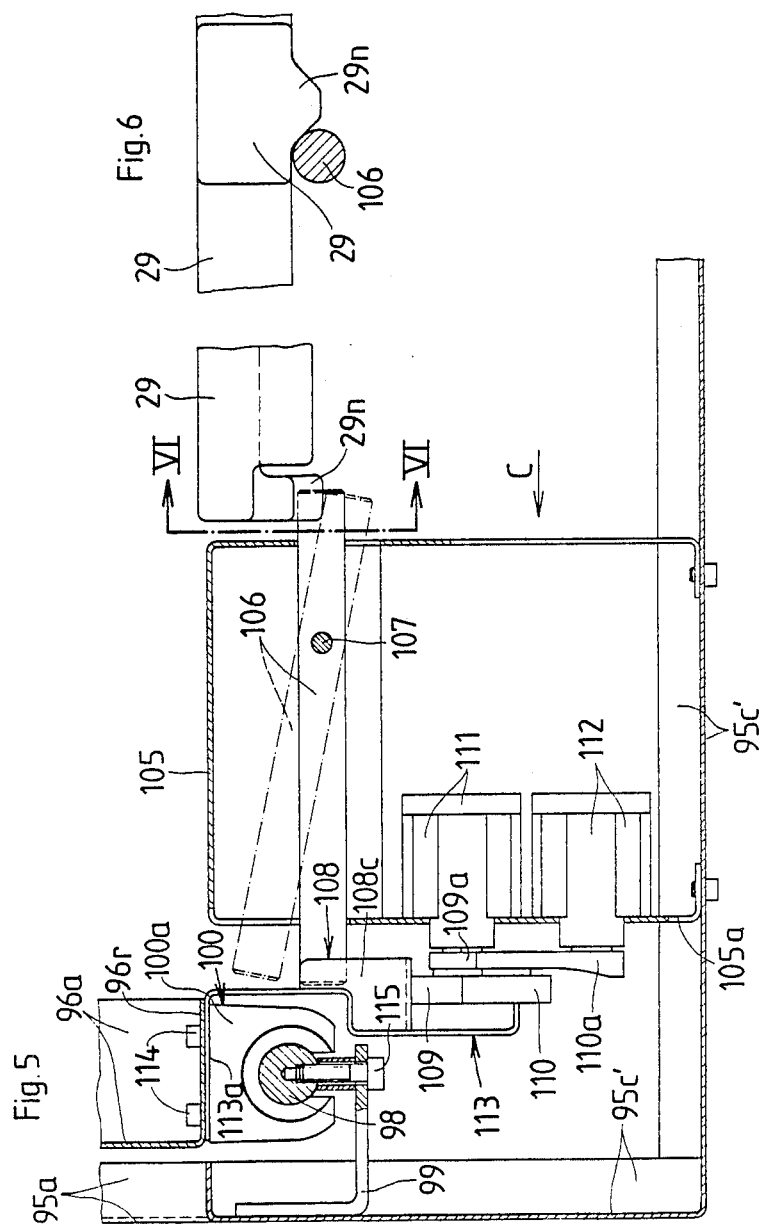

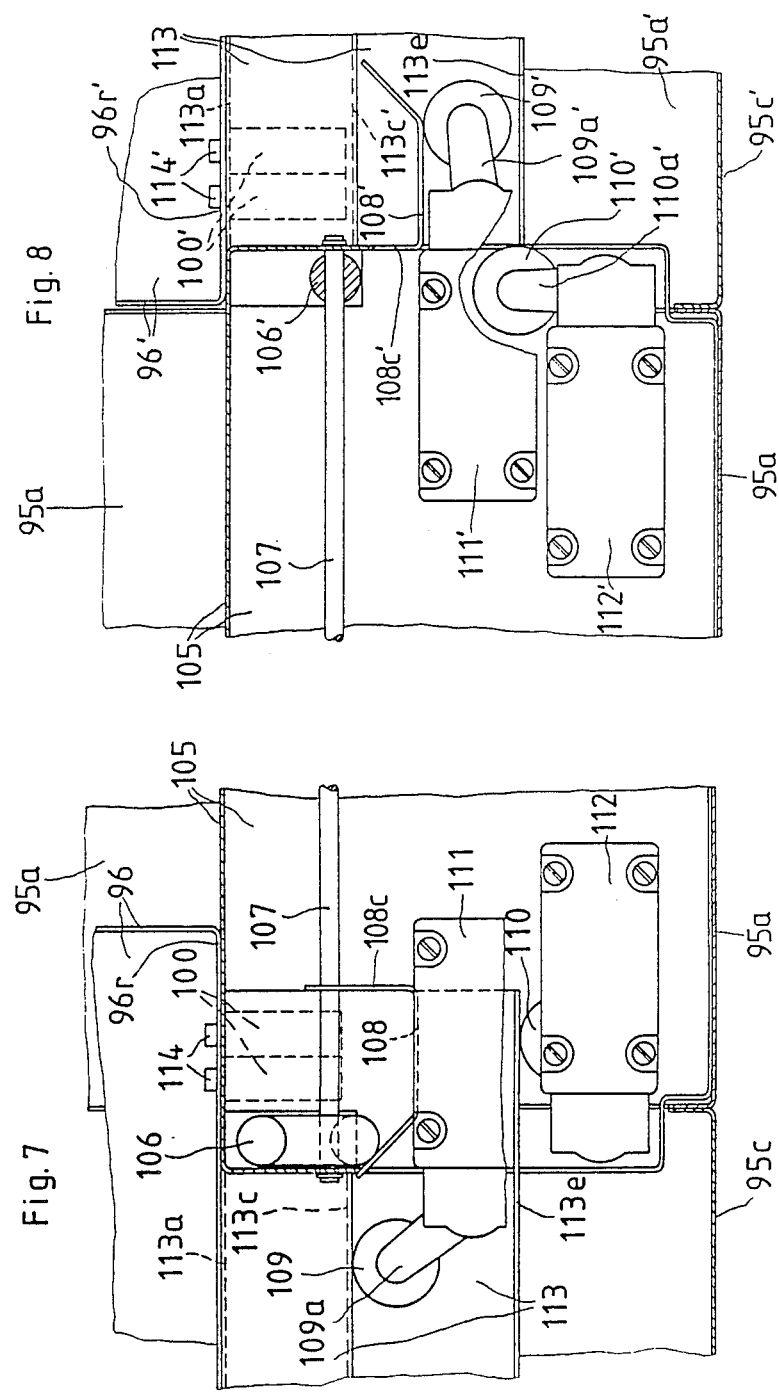

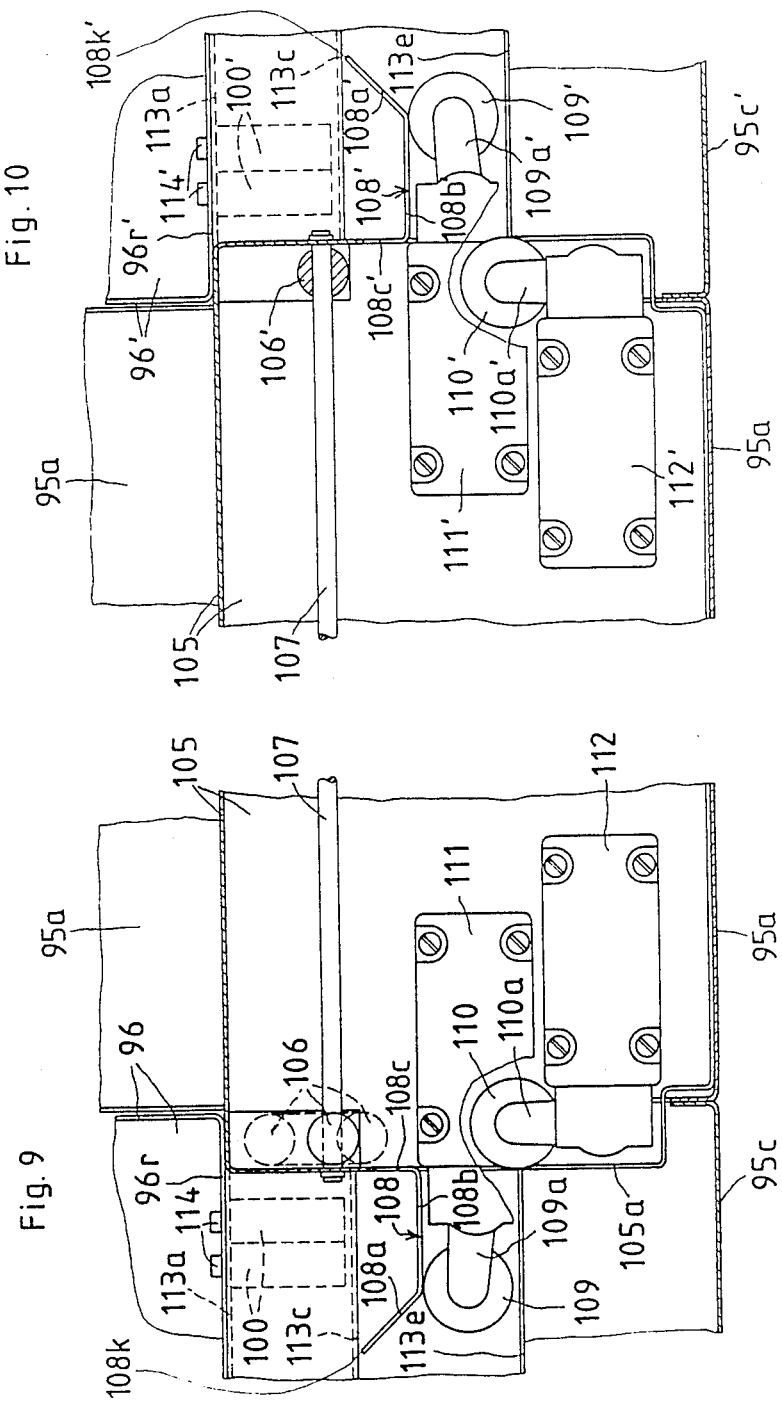

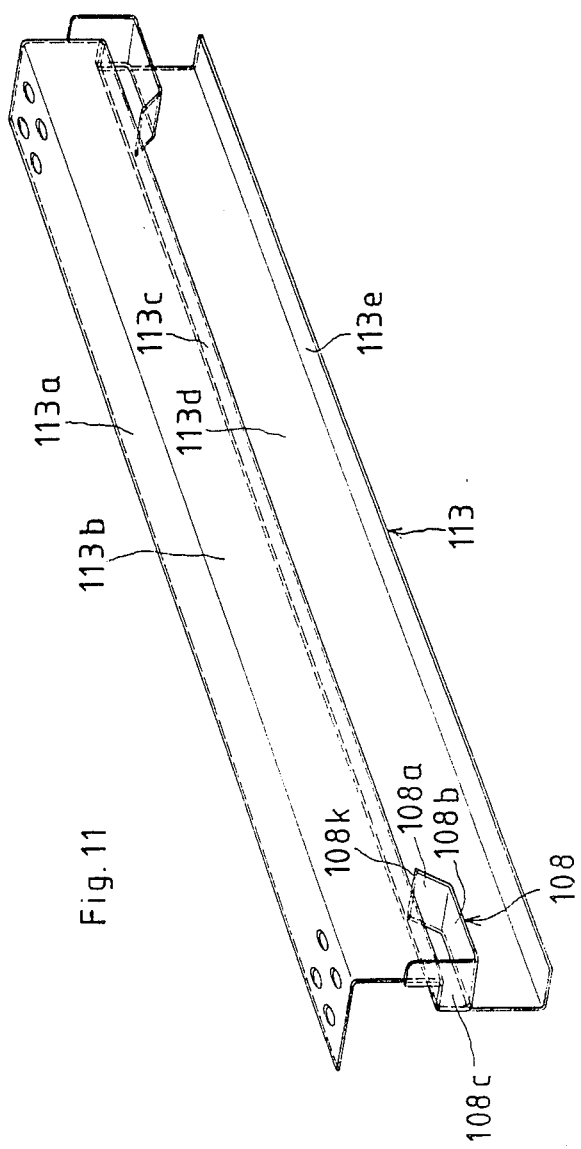

SAFETY COVER ARRANGEMENT FOR INJECTION MOLDING MACHINE WITH DIE EXCHANGE MECHANISM

BACKGROUND OF THE INVENTION

1. Field of the Invention

The present invention relates to injection molding machines and, more particularly, to an injection molding machine equipped with a device for the mechanized exchange of injection molding dies and to a safety cover arrangement for the die exchange mechanism of such a machine.

2. Description of the Prior Art

It is known to employ mechanisms for the automatic removal and insertion of die sections in injection molding machine in conjunction with the production of plastic parts with metal inserts, for example. One such mechanism is disclosed in my U.S. Pat. No. 3,973,888. The presence of a mechanized die handling device requires the arrangement of a safety cover, or covers, for the protection of the machine operator.

In the case of the die exchange mechanism of U.S. Pat. No. 3,973,888, the safety cover is a large cross-sectionally L-shaped cover panel with a vertical panel wall covering the front side of a die transfer table and a horizontal panel wall covering the upper side of the transfer table. The safety cover is guided for longitudinal opening displacements to either side of the transfer table so that, alternatingly, a left-hand and a right-hand die position on the transfer table is exposed for access by the operator. Such a safety cover is illustrated in the advertising folder entitled "Erhöhte Wirtschaftlichkeit mit Arburg Schiebetisch", and distributed by Arburg Maschinenfabrik Hehl & Söhne, 7298 Lossburg, Germany.

A major shortcoming of a one-piece safety cover of this type relates to the fact the the open cover extends laterally beyond the width of the injection molding machine, thereby presenting a potential hazard to an unsuspecting person in the vicinity of the machine, including the risk of being struck by the cover executing an opening movement. These machines also require more floor space, especially when arranged in a row of parallel oriented machines.

An additional shortcoming of this type of safety cover is that it does not lend itself to use with a die exchange mechanism which is designed for handling die assemblies with attached temperature preconditioning lines, as is the case with a device disclosed in my two copending U.S. patent applications Ser. No. 506,025 now U.S. Pat. No. 4,462,783 and Ser. No. 506,026, now U.S. Pat. No. 4,518,338 filed 20 June 1983. A cover for such a device must provide access for the attachment of the supply line harness at the die assembly on the translation table, as well as movement freedom for the attached harness during the longitudinal translation movement and the subsequent lateral transfer movement of the injection molding die.

SUMMARY OF THE INVENTION

Underlying the present invention is the primary objective of suggesting an improved safety cover arrangement for the mechanized die changing device of an injection molding machine which, while avoiding the above-mentioned shortcomings of the prior art, accommodates a die exchange mechanism of the type which is disclosed in my copending U.S. patent applications Ser. No. 506,025 now U.S. Pat. No. 4,462,783 and Ser. No. 506,026 now U.S. Pat. No. 4,518,338.

The present invention proposes to attain this objective by suggesting a safety cover assembly which is adapted for use with a die closing unit which is equipped with a die changing mechanism featuring a horizontal translation table with two longitudinally spaced die emplacements which moves between two positions in which alternatingly one or the other die emplacement occupies a central transfer position laterally outside the clamping space of the die closing unit, while the other die emplacement occupies one of two waiting positions, the safety cover assembly comprising a stationary cover portion with a vertical panel portion extending laterally outside and parallel to the translation table and a horizontal panel portion extending above and parallel to the translation table edge, two access openings in transverse alignment with the two waiting positions, for access to a die emplacement in said waiting position, two matching sliding covers occupying the two access openings and being openable, one at a time, by moving the cover behind a central stationary cover portion.

In a preferred embodiment of the invention, the two sliding covers are supported on common guides in the form of two guide rods which are engaged by ball bushings attached to the cover edges. The access openings are rectangular and extend in both the vertical and horizontal panel portions of the cover assembly. Each sliding cover has an angular cross-sectional profile fitting behind and below the central stationary cover portion, when the cover is in its open position.

The invention further features a pair of spring-biased limit switches associated with each sliding cover so as to be actuated, when the latter is opened to shut down the injection molding machine. The switches are mounted on a hollow beam between the translation table and the vertical panel portions of the cover assembly, and their switch rollers cooperate with control rails attached to the lower edges of the two sliding covers.

The preferred embodiment of the invention further suggests the use of a mechanical latching device by means of which both sliding covers are blocked in their closed positions, and only that cover is released for an opening movement behind which is positioned a die emplacement of the translation table. This latching device features a pivotable latch bar for each sliding cover which is lifted out of engagement with the latter by a release cam on the translation table.

The proposed cover assembly further includes stationary end covers which completely enclose the translation table and its die exchange mechanism against unauthorized access. When used in conjunction with a die exchanging device which is designed for the mechanized handling of die assemblies with attached temperature preconditioning supply lines, as disclosed in the earlier-mentioned U.S. patent applications Ser. No. 506,025 now U.S. Pat. No. 4,462,783 and Ser. No. 506,026, now U.S. Pat. No. 4,518,338 the cover assembly of the invention also offers a convenient mounting arrangement for the supply line harnesses under the stationary horizontal panel portion of the assembly, inside two supporting channels which also serve as a mounting support for the horizontal panel portion.

Additional advantages of the invention derive from the overall compactness of the cover assembly and from the high degree of safety it provides for the machine operator.

BRIEF DESCRIPTION OF THE DRAWINGS

Further special features and advantages of the invention will become apparent from the description following below, when taken together with the accompanying drawings which illustrate, by way of example, a preferred embodiment of the invention, represented in the various figures as follows:

FIG. 5 shows, in a transverse cross section, an enlarged detail of FIG. 1 relating to a safety mechanism cooperating with the lower edges of the sliding covers;

FIG. 6 shows the safety mechanism of FIG. 5 in a longitudinal section taken along line VI—VI thereof;

FIGS. 7 and 8 show the safety mechanism of FIG. 5, as seen in the direction of arrow C in FIG. 5, FIG. 7 showing a portion of the right-hand sliding cover of FIG. 2, at an initial stage of its opening movement, and FIG. 8 showing the corresponding left-hand sliding cover in its closed position;

FIGS. 9 and 10 correspond to FIGS. 7 and 8, showing both sliding covers in their closed positions; and FIG. 11 shows, in a perspective view, a control rail of a sliding cover.

DESCRIPTION OF THE PREFERRED EMBODIMENT

Figure 1:
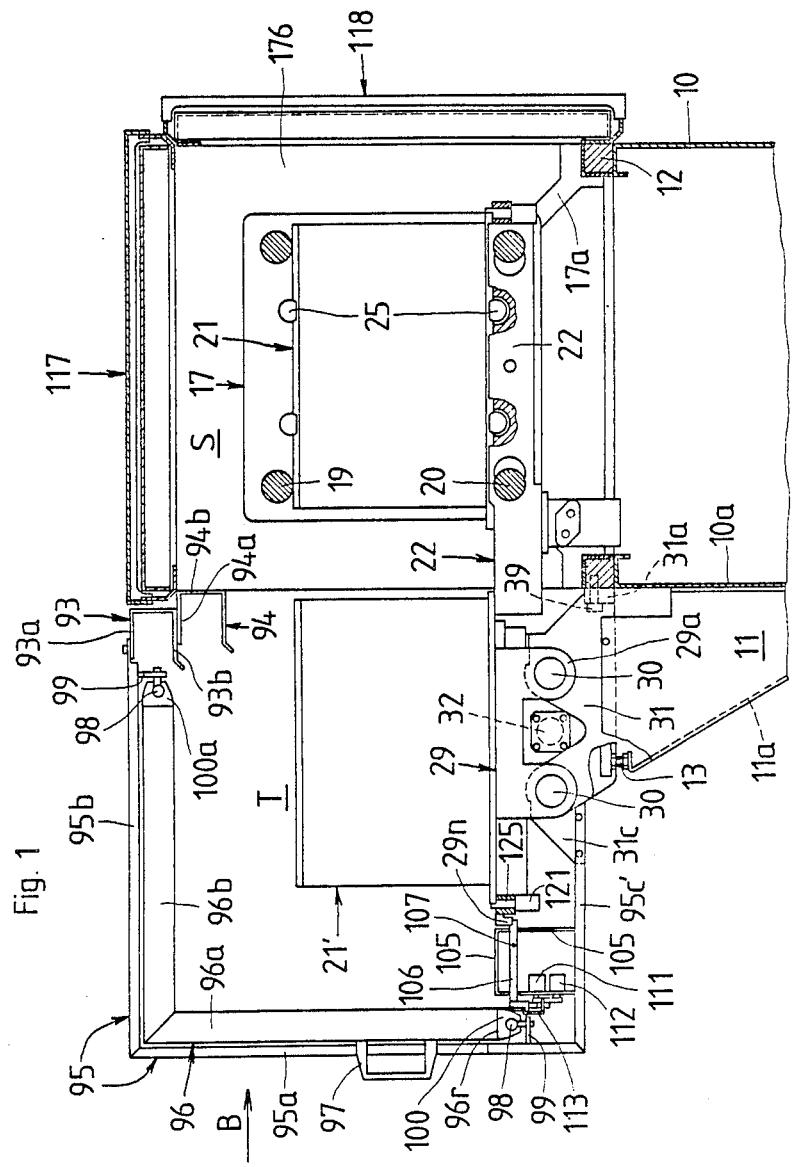
FIG. 1 shows, in a lateral elevational view (direction A of FIGS. 3 and 4) and partially cross-sectioned, the central portion of a die closing unit of an injection molding machine equipped with a die exchange mechanism and a safety cover assembly embodying the present invention.

FIGS. 1 through 4 show the central portions of a die closing unit of an injection molding machine which is equipped with a device for the mechanized insertion and removal of a succession of different die assemblies. The die closing unit consists essentially of a stationary die carrier member 17, a movable die carrier member 18, a stationary cylinder head plate, not shown, and an axially extending hydraulic cylinder assembly, likewise not shown.

A pair of upper tie rods 19 and a pair of lower tie rods 20, extending between the stationary die carrier member 17 and the stationary cylinder head plate, form a rigid stationary guide frame for the movable die carrier member 18. To the stationary die carrier member 17 and to the movable die carrier member 18 are attached, respectively, the stationary and movable halves of an injection molding die, or die assembly 21.

The die closing unit is supported on a box-shaped machine base 10 (FIG. 1) which, for this purpose, has arranged on its upper longitudinal edges two guide rails 12. The stationary die carrier member 17 engages the guide rails 12 with diagonally extending mounting struts 17a; the stationary cylinder head plate engages the guide rails 12 with similar mounting struts.

The movable die carrier member 18, in addition to being guided on the four tie rods 19 and 20, is also supported and guided on the guide rails 12. The member 18 consists of a vertical die mounting wall 18a facing forwardly, a vertical pressure transfer wall 18c facing rearwardly, and a number of intermediate horizontal pressure transfer ribs 18b transmitting the die closing pressure from the pressure transfer wall 18c to the die mounting wall 18a. The forward extremity of the piston rod of the hydraulic cylinder assembly is attached to the pressure transfer wall 18c.

While a first die assembly 21 is shown in its operating position in the clamping space S of the die closing unit, a second die assembly 21' can be seen in a waiting position, on a die emplacement N on a translation table 29, as will be described in greater detail further below. The two die assemblies 21 and 21' may be of different dimensions, including unequal axial widths.

In order to facilitate the mechanized handling of a number of different die assemblies, each die assembly is equipped with a pair of standardized back plates 21a and 21b, or 21a' and 21b', respectively. The back plates 21a and 21b extend vertically above and below the cavity plates of each die assembly, so as to support the die assembly on the translation table 29 and to guide it during insertion into and removal from the clamping space S.

The two back plates 21a and 21b also serve an important role in connection with an automatic die attachment device by means of which the two die halves are clamped to the die carrier members 17 and 18 in the clamping space S. This attachment device includes two pairs of upper and lower clamping plungers 25 with clamping noses 25a which are engageable behind the stationary back plates 21a and 21b of the die assembly 21, so as to pull the two die halves against the mounting faces of the stationary die carrier member 17 and of the die mounting wall 18a, respectively. The clamping plungers 25 are moved by means of hydraulic cylinders 27.

Figure 4:
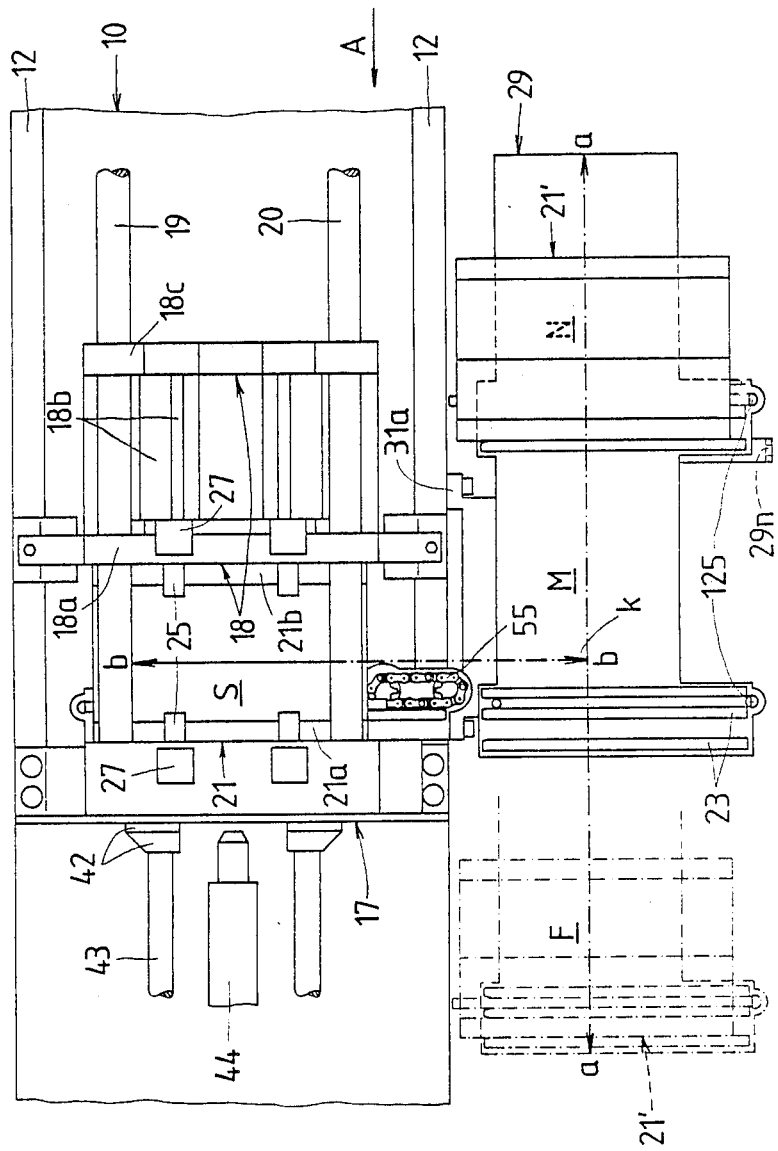
FIG. 4 shows the die closing unit of FIGS. 1 and 3 in a plan view, with all covers removed.

FIG. 4 also shows portions of an injection unit which has two guide rods 43 attached to the stationary die carrier member 17 by means of mounting elements 42. The guide rods 43 support a bridge member of the injection unit which carries a central axially aligned plastification cylinder 44. The latter is movable axially into engagement with the die assembly 21, reaching through a central aperture in the stationary die carrier member 17.

The translation table 29 is part of a mechanism for the program-controlled exchange of injection molding dies. This mechanism operates to remove the first die assembly 21, following release of the clamping plungers 25, by first transferring it along a transfer path b—b from its operating position in the clamping space S to a transfer position M on the translation table 29 (FIG. 4). From the transfer position M, the die assembly is then moved longitudinally along a translation path a—a to a waiting position F located a distance to the left of the transfer position M.

The insertion of the second die assembly 21' requires the same movements in reverse order, the second die assembly 21' being moved from its right-hand waiting position N to the transfer position M, at the same time as the first die assembly 21 is moved to the waiting position F.

For this purpose, the translation table 29 has arranged on its upper side two identical die emplacements at a longitudinal distance which is designed to accommodate die assemblies of maximum axial width. The translation table 29 is arranged to move longitudinally between two positions in which alternatingly the one or the other die emplacement coincides with the transfer position M in which it is transversely aligned with the clamping space S for transfer of a die assembly. The other die emplacement then occupies the waiting position F or N, respectively.

Figure 3:
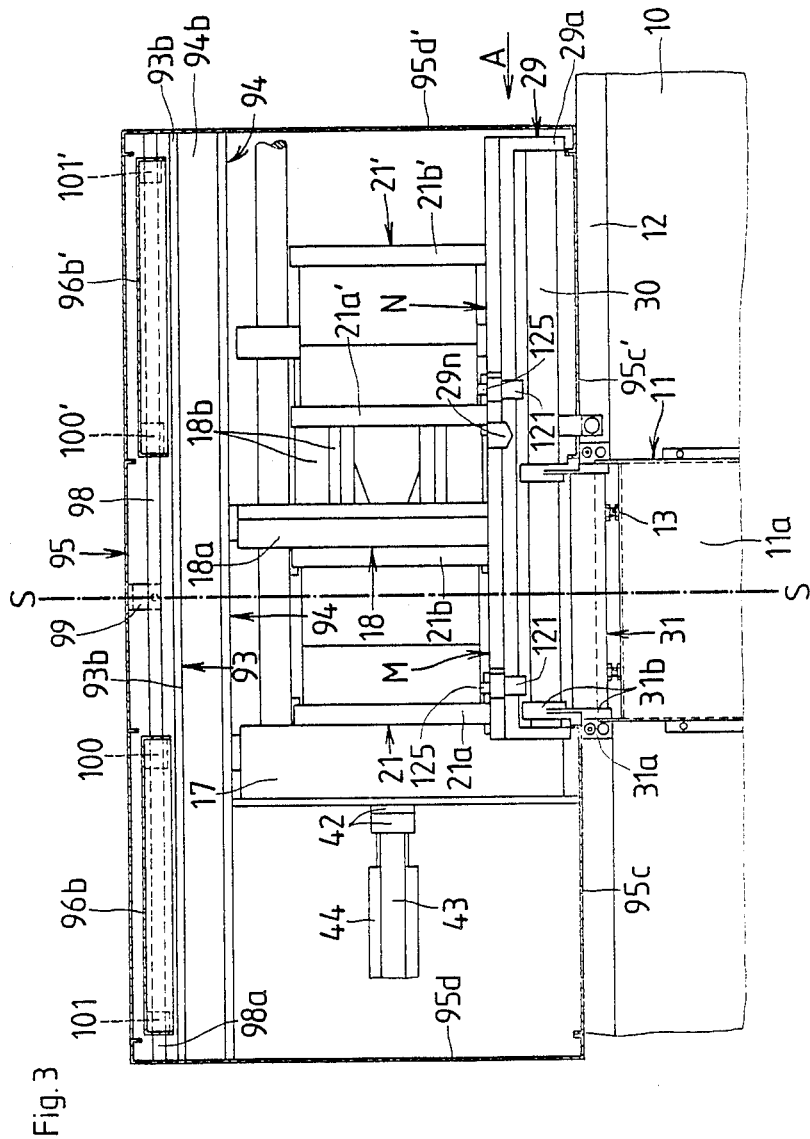
FIG. 3 corresponds to FIG. 2, the cover assembly being sectioned longitudinally and its frontal portions being removed to expose the die exchange mechanism.

As can be seen in FIGS. 1 and 3, the translation table 29 is supported on a supporting frame 31 which, in turn, is caried by a sheet metal bracket 11. The latter is attached to the longitudinal wall 10a of the machine base 10. A leveling device 13 atop the inclined outer wall 11a of the sheet metal bracket 11 provides vertical adjustability for the supporting frame 31. Mounting legs 31a on the supporting frame 31 serve for the clamping attachment of the frame 31 to the side of one of the guide rails 12 by means of bolts 39.

Two parallel guide rods 30 which extend between depending attachment ears 29a at the extremities of the translation table 29 provide support and guidance for the latter in cooperation with guide bores in the transverse wall members 31b of the supporting frame 31.

The longitudinal movements of the translation table 29 are obtained by means of a hydraulic cylinder assembly 32 which is arranged centrally between, and parallel to, the guide rods 30 (FIG. 1). The hydraulic cylinder assembly 32 has its cylinder fixedly mounted between the two mounting legs 31a of the supporting frame 31, the outer extremity of its piston rod being adjustably connected to one of the two attachment ears 29a. The stroke of the hydraulic cylinder assembly 32 equals the axial distance between the two die emplacements on the translation table 29 (FIG. 4).

Transfer movements of a die assembly between the transfer position M on the translation table 29 and the clamping space S are obtained by means of a transfer chain 55 which is arranged underneath the clamping space S (FIG. 4). The transfer chain 55 carries a series of upstanding drive pins which cooperate with a drive rack at the underside of the die assembly, thereby pulling the die assembly along the transfer path b—b.

During the transfer movement, the die assembly is guided by means of aligned guide members on the stationary die carrier member 17 and on the translation table 29 which engage the back plate 21a of the stationary die half on opposite sides. Each of the two die emplacements on the translation table 29 is equipped with a limit switch 121 and an upstanding switch plunger 125 reaching into the path of the drive rack (FIG. 3).

Figure 2:
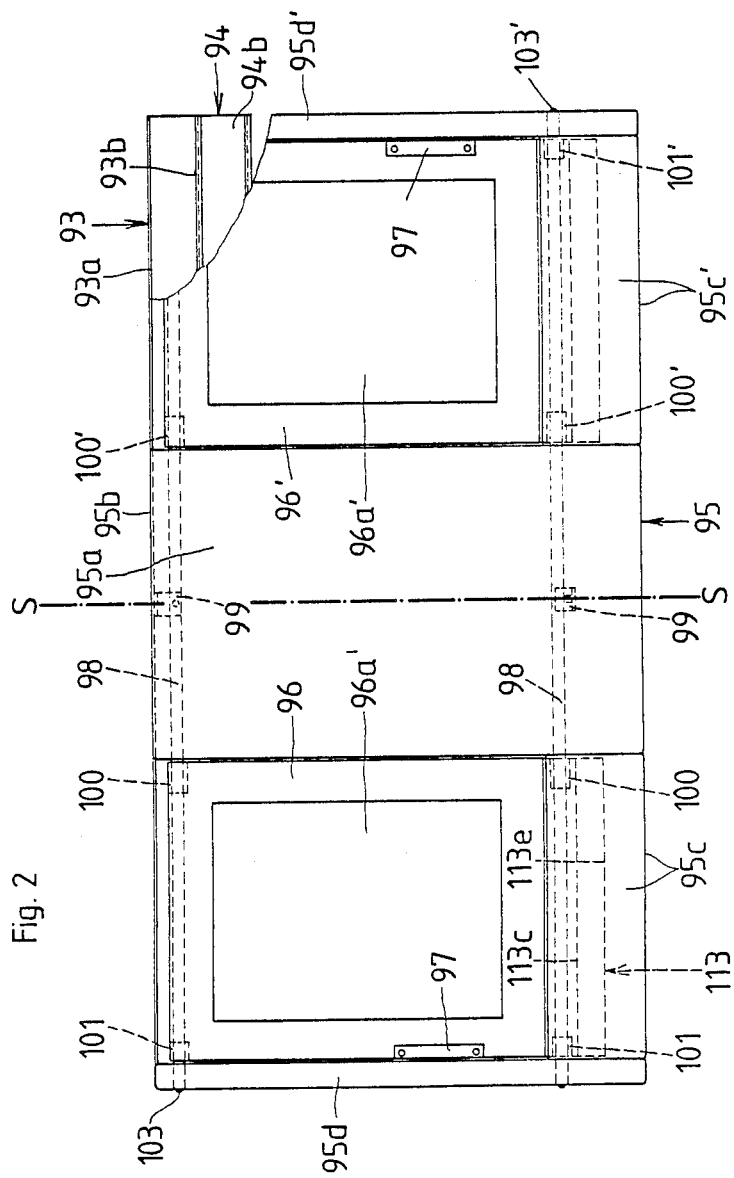
FIG. 2 shows the safety cover assembly of the die closing unit of FIG. 1 in a frontal view (direction B in FIG. 1)

As can be seen in FIGS. 1, 2 and 3, the translation table 29 and the die assembly, or die assemblies, supported thereon are enclosed within a safety cover assembly. The safety cover assembly consists essentially of a central stationary cover portion 95 in transverse alignment with the clamping space S, two sliding covers 96 and 96' on axially opposite sides of the stationary cover portion 95, stationary end covers 95d and 95d' at the longitudinal extremities of the cover assembly, and upper and lower horizontal stationary panels 95b and 95c.

The central stationary cover portion 95, as well as the two sliding covers 96 and 96', have an angular cross-sectional outline (FIG. 1), extending vertically from a level below the translation table 29 to the same level of the upper cover panel 117 of the die closing unit, the inner horizontal end portions of the safety cover assembly adjoining the cover panel 117.

As can be seen in FIG. 1, the sliding covers 96 and 96' are so arranged that their vertical panel portions are located laterally behind, and their horizontal panel portions vertically underneath, the corresponding panel portion of the central stationary cover portion 95. This means that, in an opening movement, the vertical and horizontal panels of the sliding cover 96 or 96' move behind and underneath the corresponding vertical and horizontal panels of the stationary cover portion 95.

Accordingly, when the two sliding covers are closed, it is impossible for a person to reach into the area of the translation table 29 from any direction. The invention thus provides an important safety contribution in connection with this type of injection molding machine.

Each of the two sliding covers 96 and 96', when open, provides access to the translation table 29 and to a die assembly on the table from the side and from above. This access from two directions is essential, when mechanized hoisting equipment is utilized to place and remove the die assemblies.

While the length of the translation table 29 is equal to about twice the distance between the two die emplacements on the table, the length of the safety cover assembly is equal to approximately three times that distance, in order to accommodate the longitudinal movements of the table 29 inside the cover assembly. As can be seen in FIG. 3, the central stationary cover portion 95 and the two sliding covers 96 and 96' are of substantially the same axial width, which is roughly one-third of the length of the safety cover assembly, or equal to the distance between the two die emplacements.

Two guide rods 98 arranged near the vertical lower extremity and horizontal inner extremity of the angular sliding covers 96 and 96' (FIG. 1) provide support and guidance for both sliding covers. Only one of the two sliding covers can be opened at any one time by moving behind the central stationary cover portion 95, against the other sliding cover. The guide rods 98 are attached to the stationary end covers 95d and 95' by means of rod attachment bolts 103 (FIG. 2).

As will be described further below, the safety cover assembly of the invention is equipped with a latching mechanism which permits opening of only that sliding cover behind which is located the laterally extended translation table 29 with a die emplacement in a waiting position. The latter would normally be occupied by a die assembly. This means that, in the table position which is illustrated in the drawing, where the die assembly 21' is shown in the waiting position N, only the right-hand sliding cover 96' can be opened.

Since the two sliding covers 96 and 96' are identical in size and arranged symmetrically with respect to the central stationary cover portion 95, the following description of the safety cover control mechanisms will be concerned primarily with the left-hand side of the safety cover assembly and with the sliding cover 96. Corresponding parts and features on the right-hand side of the assembly are designated in the drawing with primed reference numerals and, to the extent that they are not specifically mentioned and described herein, should be assumed to be covered by the description relating to the non-primed reference numerals.

The sliding cover 96 is guided on the two guide rods 98 by means of ball bushings 100 and 101, the ball bushings 100 having a longitudinal slot allowing them to move past central supporting brackets 99 which support the guide rod 98 on the vertical stationary panel 95a and the upper horizontal stationary panel 95b. Bolts 115 and spacers attach the guide rods 98 to the supporting brackets 99 (FIG. 5), and screws 114 attach the ball bushings 100 and 101 to the outer side of upstanding panel flanges 96r at the circumference of the sliding covers 96 and 96' (FIG. 5).

Each of the two sliding covers 96 and 96' has arranged in its vertical cover panel 96a a window 96a" for the visual inspection of the translation table 29 and its movements. To the distal vertical edge of each sliding cover is further attached a handle 97 which can serve as a stop for the sliding cover in its opening and closing movements, in cooperation with the central stationary cover portion 95 and the stationary end covers 95d and 95d' (FIG. 2).

As can be seen in FIG. 1, the central stationary cover portion 95 and the sliding cover 96 have parallel angular cross-sectional profiles, the vertical panel 96a and the horizontal panel 96b of the sliding cover 96 moving with a small clearance underneath the corresponding vertical panel 95a and upper horizontal panel 95b of the central stationary cover portion 95.

The inner edge of the upper horizontal stationary panel 95b is supported on the die closing unit by means of an upper supporting channel 93 and a lower supporting channel 94, the latter being attached at 94b to a portal-shaped frame 176 which also carries a horizontal safety gate 117 and a vertical safety gate 118. These safety gates provide access to the die closing unit from the operator's side.

The upper and lower supporting channels 93 and 94 have horizontally extending leg portions, the lower leg portion 93b of the upper supporting channel 93 resting on the upper leg portion 94a of the lower supporting channel 94. The upper leg portion 93a of channel 93 is approximately level with the upper cover panel 117, and to it is attached the inner edge of the upper horizontal stationary panel 95b.

In connection with the device disclosed in my earlier-mentioned copending U.S. application Ser. No. 506,026, the supporting channels 93 and 94 may serve the additional purpose of accommodating and supporting electrical lines and preconditioning lines carrying conditioning fluid. For example, the upper supporting channel 93 may hold a harness of electrical lines, and the lower supporting channel 94 may carry portions of two harnesses of fluid lines: A first harness portion would run from the right-hand side of the die closing unit to the center and from there to the waiting die assembly 21', and a second harness portion would run from the left-hand side to the center and from there to the first die assembly 21 in operating position. In this case, the length portions running from the center of the die closing unit to the two die assemblies are flexible, hanging length portions.

FIG. 1 also shows that the lower horizontal stationary panels 95c and 95c' of the central stationary cover portion 95 are attached to and supported by attachment brackets 31c of the supporting frame 31. The panels 95c and 95c' also support the stationary end covers 95d and 95d'.

Referring to FIG. 5, which shows the bottom portion of the cover assembly and the edge of the translation table 29 as an enlarged detail of FIG. 1, it can be seen that the lower horizontal stationary panel 95c carries a box-shaped hollow beam 105 which substantially fills in the gap between the translation table 29 and the lower edge of the opening in the vertical stationary panel 95a.

Inside the hollow beam 105, and supported by its outer vertical wall 105a, are arranged sets of switches 111 and 112 forming part of a safety mechanism involving the operation of the two sliding covers 96 and 96'. The switches 111 and 112 are responsive to the movements of the sliding covers 96 and 96', each of the latter carrying a control rail 113 attached to its lower panel flange 96r by means of screws 114. As mentioned earlier, the screws 114 also hold in place the slotted ball bushing 100.

The control rail 113 is a sheet metal stamping with a generally S-shaped cross-sectional outline, obtained through a number of right-angle bends. A detached control rail 113 is shown in FIG. 11. Its length is approximately equal to the axial length of the sliding cover 96. To each extremity of the control rail 113 is attached a switch cam 108 which is designed to actuate the upper stationary switches 111, at the same time as the lower end flange 113e of the control rail 113 actuates the lower stationary switches 112, as will be explained in the following, with reference to FIGS. 7 through 10.

Each switch cam 108 has a ramp portion 108a, a horizontal portion 108b, and a vertical portion 108c. The control rail 113 (FIG. 11) presents an upper horizontal end flange 113a, an adjoining vertical wall portion 113b, an intermediate horizontal wall portion 113c, a vertical wall portion 113d, and a lower horizontal end flange 113e. The switch cam 108 has its vertical portion 108c positioned flush with the longitudinal extremity of the control rail 113, its horizontal portion 108b being parallel and below the intermediate horizontal wall portion 113c, and its ramp edge 108k forming a transition between the horizontal portion 108b and the intermediate horizontal wall portion 113c of the control rail 113.

By comparing FIG. 7 with FIG. 9, it can be seen that, in FIG. 9, the left-hand sliding cover 96 is in its closed position, whereas, in FIG. 7, it has been opened a short distance towards the vertical stationary panel 95a. In FIG. 8, as well as in FIG. 10, the right-hand sliding cover 96' is shown in its closed position.

In the closed position of the sliding cover 96, the stationary switch 111 is depressed, its switch roller 109 being engaged by the horizontal portion 108b of the switch cam 108. The switch roller 109, supported on a switch arm 109a, is spring-biased upwardly against the switch cam 108. At the same time, the stationary switch 112 is in its released position, the switch roller 110 facing the leading edge of the lower horizontal end flange 113e of the control rail 113.

A short initial opening movement of the sliding cover 96 has removed the switch cam 108 from the switch roller 109 of the switch 111, thereby allowing the latter to assume the released position of FIG. 7. At the same time, the advancing edge of the the lower horizontal end flange 113e has pushed the switch roller 110 of the switch 112 out of its path, thereby depressing and actuating the switch. The lower faces of the intermediate horizontal wall portion 113c and of the lower horizontal end flange 113e maintain the switch rollers 109 and 110 in these positions during the remainder of the opening movement.

The switch arm 110a of the switch roller 110 is springbiased in the opposite direction of the switch arm 109a. Accordingly, if, in the closed position of the sliding cover 96, the switch arm 110a is already partially depressed, prior to being actuated, it can serve as a closing detent for the sliding cover 96 by pressing against the leading edge of the lower horizontal end flange 113e of the control rail 113.

The two switches 111 and 112 are part of the control circuitry of the injection molding machine and so arranged in their operation that, whenever one of the two sliding covers 96 or 96' is opening during normal operation of the machine, the machine is automatically shut down.

As can be seen in FIG. 5, the switches 111 and 112 are mounted on the inside of the hollow beam 105, against its outer vertical wall 105a. The switches are so arranged that their actuating mechanisms protrude outwardly from the vertical wall 105a into engagement with the control rail 113.

The hollow beam 105, in addition to holding the safety switches 111 and 112 and serving as an intermediate stationary surface between the cover assembly and the translation table 29, also accommodates a mechanical latching mechanism by means of which the sliding covers 96 and 96' are locked in their closed positions and only one cover at a time is released for an opening movement, and only then, when the translation table 29 is in position behind the sliding cover 96.

This is accomplished by means of two transversely extending latch bars 106 (FIG. 7) and 106' (FIG. 8) which are arranged to execute a rocking movement on a fixed pivot rod 107. The latter is supported in the axial end walls of the hollow beam 105, extending parallel to the translation table 29. FIG. 5 shows that the longer, heavier arm of each latch bar 106 reaches outwardly through a slot in the vertical wall 105a of the hollow beam 105, being held in its horizontal rest position by the bottom of said slot. In this position, the outer extremity of the latch bar 106 faces the vertical portion 108c of the switch cam 108, thereby preventing an opening movement of the sliding cover 96 (see also FIG. 9).

The shorter arm of each latch bar 106 extends inwardly through a slot in the inner vertical wall of the hollow beam 105 into the path of a release cam 29n at the edge of the translation table 29. The release cam 29n is arranged at approximately mid-length of the translation table 29 (FIG. 4), and the axial distance between the two latch bars 106 equals the distance of travel of the translation table 29.

The simultaneous opening of the two sliding covers 96 and 96' is additionally made impossible by the very configuration of the safety cover assembly, as a result of the fact that the same space—behind and underneath the central stationary cover portion 95—is occupied by either sliding cover in the open position. Thus, even in the case of deliberate tampering with the latching mechanism, an attempt to simultaneously open both sliding covers will at best produce half-open covers.

By thus limiting access to the translation table 29 and to the die changing mechanism to a single access opening facing the translation table 29 in either the waiting position N or the waiting position F, and by controlling this access with a sliding cover secured by double switches, the invention provides a maximum degree of safety against operator injuries due to error and/or carelessness. Nevertheless, the automatic operation of the die changing mechanism is at all times visually observable through the windows 96a' of the sliding covers 96 and 96'.

The safety cover arrangement of the present invention, while being particularly adapted for use in conjunction with a device for the mechanized exchange of injection molding dies in a die closing unit, is also advantageously usable in conjunction with a device as described in U.S. Pat. No. 3,973,888 which describes an injection molding machine using multiple identical die sections which are alternatingly removed and reinserted into the die closing unit with the aid of a similar transfer table, following the manual placement a special insert component into each die section.

It should be understood, of course, that the foregoing disclosure describes only a preferred embodiment of the invention and that it is intended to cover all changes and modifications of this example of the invention which fall within the scope of the appended claims.

I claim the following:

1. A safety cover assembly for die closing unit of an injection molding machine equipped with a die exchange mechanism for the program-controlled insertion into and removal from the die closing unit of a succession of injection molding die assemblies or die halves, wherein the die exchange mechanism includes an elongated horizontal translation table with two longitudinally spaced die emplacements thereon and a translation drive moving the table longitudinally between two positions in which alternately one or the other of the two die emplacements occupies a central transfer position located laterally outside the clamping space of the die closing unit, while the other die emplacement occupies one of two waiting positions, and said mechanism further includes transfer guides and a transfer drive adapted to move said die assembly or die half transversely between the transfer position and the clamping space, and wherein the die closing unit and the translation table are supported on a machine base, the safety cover assembly comprising in combination:

a stationary central cover portion having a vertical stationary cover panel covering said central transfer position against lateral access thereto, while defining access an opening on opposite axial sides thereof, in approximate transverse alignment with said two waiting positions, for access to a die emplacement in waiting position; and two sliding covers arranged to cover the two access openings, when the covers are in their closed position and movable longitudinally away from said openings, along cover guides extending parallel to the translation table; and wherein each sliding cover is openable by moving said sliding cover in the direction of the central stationary cover portion so that, in the position of said sliding cover, is substantially superposed with the stationary cover portion; said sliding cover and the two sliding covers move to substantially the same open position so that, when a first one of the two sliding covers is held in this position, said first sliding cover prevents the second sliding cover from being opened.

2. A safety cover assembly as defined in claim 1, wherein the two sliding covers are supported on common cover guides extending parallel to the direction of movement of the translation table.

3. A safety cover assembly as defined in claim 1, wherein the cover guides include two stationary guide rods serving as a common support for both sliding covers; and the sliding covers include ball bushings engaging the guide rods.

4. A safety cover assembly as defined in claim 1, wherein
the vertical panel portion of the stationary cover portion extends laterally outside and parallel to the translation table;
the stationary cover portion further includes a horizontal panel portion extending above the parallel to the translation table and adjoining said vertical panel portion at the upper edge of said vertical panel portion;
the access openings of the stationary cover portion are of cross-sectionally angular outline, extending from the junction of said vertical and horizontal panel portions a substantial distance in the planes of both panel portions, for access to the translation table from the side and from above; and
the two sliding covers have a corresponding cross-sectionally angular outline comprised of a vertical panel portion and an adjoining horiztontal panel portion.

5. A safety cover assembly as defined in claim 4, wherein
the cover guides for the two sliding covers include a first guide rod extending near the bottom edge of the vertical cover panels and a second guide rod extending near the inner edge of the horizontal cover panels, the two guide rods serving as a common support for both sliding covers; and
the two guide rods are so arranged that each sliding cover, when opened, moves behind and below the central stationary cover portion, in such a way that the vertical cover panel of said sliding cover is located just inside the vertical panel portion of the central stationary cover portion, and the horizontal cover panel of said sliding cover is located just below the horizontal panel portion of the latter.

6. A safety cover assembly as defined in claim 4, wherein
the die closing unit includes a horizontal cover member on its upper side;
the horizontal panel portion of the stationary cover portion is located at approximately the same level as said horizontal cover member, forming a substantially continuous enclosure therewith; and
the cover assembly further includes two stationary end covers arranged adjacent to the axially distal sides of the two access openings of the stationary cover portion, the end covers extending form the plane of the vertical stationary panel portions to the die closing unit, thereby forming an enclosure for the translation table which prevents access from an axial direction.

7. A safety cover assembly as defined in claim 4, wherein
the horizontal panel portion of the stationary cover portion is supported on the die closing unit by means of two horizontally extending supporting channels which are attached to a portal-shaped structure of the die closing unit.

8. A safety cover assembly as defined in claim 1, further comprising
electrical switching means responsive to the opening movement of a sliding cover to initiate a safety-related procedure, when a sliding cover is opened during operation of the injection molding machine.

9. A safety cover assembly as defined in claim 8, wherein
the switching means includes a plurality of stationary limit switches which are mounted in the space between the vertical panel portion of the central stationary cover portion and the translation table; and
each sliding cover has a bottom edge with a control rail attached thereto, the control rail including at least one switch cam cooperating with said limit switches.

10. A safety cover assembly as defined in claim 9, wherein
the control rail is a sheet metal stamping of S-shaped cross section, having an upper horizontal end flange by which the control rail is attached to a panel flange at the lower edge of the sliding cover and a lower horizontal end flange cooperating with one of the two limit switches; and
the control rail further includes an intermediate horizontal wall portion to which is attached a switch cam with a ramp portion cooperating with the other limit switch.

11. A safety cover assembly as defined in claim 9, wherein
the switching means includes two spring-biased, depressible limit switches associated with each sliding cover, the switches being so arranged that, in the closed position of the sliding cover, one switch is depressed while the other one is released, and a short initial movement of the sliding cover causes the depressed switch to be released and the released switch to be depressed.

12. A safety cover assembly as defined in claim 11, wherein
the limit switch which is in the released state in the closed position of the sliding cover has a switching member which is partially depressed but not actuated by the control rail of the closed sliding cover, the switching member thereby bearing against an extremity of the control rail to produce a spring detent action which holds the sliding cover closed.

13. A safety cover assembly as defined in claim 1, further comprising
latching means operative to normally block the two sliding covers against an opening movement and to release either one of the two sliding covers only when a die emplacement of the translation table is in the waiting position associated with the particular sliding cover.

14. A safety cover assembly as defined in claim 13, wherein
the latching means includes two latch bars, one associated with each sliding cover, the latch bars extending transversely between the translation table and the sliding covers, being pivotably supported on a pivot rod which extends parallel to the direction of translation table movement;
each latch bar is biased towards a normal rest position in which the outer extremity cooperates with the associated sliding cover to block the opening movement of said sliding cover; and
the translation table includes a release cam which cooperates with the inner extremities of the two latch bars to release one of them in each end position of the translation table.

15. A safety cover assembly as defined in claim 14, wherein
each latch bar is a straight rod, being supported by the pivot rod in the manner of a balance beam, the outer arm of the latch bar being heavier, so as to impose a downward bias on the outer extremity of the rod; and the release cam cooperates with the inner extremity of the rod by tripping said inner extremity downwardly, thereby lifing the outer extremity of the rod out of the path of a blocking member which is attached to the sliding cover.

16. A safety cover assembly as defined in claim 13, further comprising a stationary hollow beam arranged between the central stationary cover portion and the translation table so as to support and enclose the latching means, the hollow beam having a horizontal upper surface in approximate alignment with the surface of the translation table and with the lower edge of the two access openings in the stationary cover portion.

17. A safety cover assembly as defined in claim 1, wherein the two sliding covers have an angular cross-sectional outline, defined by a vertical panel portion and a horizontal panel portion adjoining the vertical panel portion at the upper edge of the vertical panel portion; and each sliding cover has an observation window in at least the vertical panel portion thereof.

* * * * *